US011273831B2

(12) United States Patent
Yako

(10) Patent No.: US 11,273,831 B2
(45) Date of Patent: Mar. 15, 2022

(54) VEHICLE AND CONTROL DEVICE FOR THE SAME

(71) Applicant: HONDA MOTOR CO., LTD., Tokyo (JP)

(72) Inventor: Ryujiro Yako, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 128 days.

(21) Appl. No.: 16/715,398

(22) Filed: Dec. 16, 2019

(65) Prior Publication Data

US 2020/0223436 A1 Jul. 16, 2020

(30) Foreign Application Priority Data

Jan. 15, 2019 (JP) .............................. JP2019-004609

(51) Int. Cl.
*B60W 30/16* (2020.01)
*B60W 30/18* (2012.01)
*B60N 3/06* (2006.01)
*G05D 1/02* (2020.01)
*B60W 10/04* (2006.01)
*B60W 10/20* (2006.01)

(52) U.S. Cl.
CPC .............. *B60W 30/16* (2013.01); *B60N 3/06* (2013.01); *B60W 10/04* (2013.01); *B60W 10/20* (2013.01); *B60W 30/18163* (2013.01); *G05D 1/0223* (2013.01); *G05D 2201/0212* (2013.01)

(58) Field of Classification Search
CPC .............. B60W 30/16; B60W 10/04; B60W 30/18163; B60W 10/20; B60N 3/06; G05D 1/0223; G05D 2201/0212; B60K 26/02; B60K 2026/029; B60T 7/06; B62D 1/02
See application file for complete search history.

(56) References Cited

U.S. PATENT DOCUMENTS 10,232,858 B2    3/2019  Odate
2004/0195022 A1* 10/2004 Inoue ................. B60K 31/0008
                                                          180/170
2016/0264131 A1*  9/2016 Chan .................... A61B 5/4875
(Continued)

FOREIGN PATENT DOCUMENTS

DE   102013202427 A1 * 8/2014 ............... G05G 1/30
JP      2010100107 A  * 5/2010
(Continued)

OTHER PUBLICATIONS

English Translation: Ozaki, JP 2010100107 A, May 2010, Japanese Patent Office Publication (Year: 2010).*
(Continued)

*Primary Examiner* — Nadeem Odeh
(74) *Attorney, Agent, or Firm* — Thomas | Horstemeyer, LLP

(57) ABSTRACT

A control device for a vehicle that has a footrest that is located in front of and below a driver's seat is provided. The device includes a travel control unit configured to automatically perform travel control that includes at least one of: acceleration/deceleration; and steering, of the vehicle, and a footrest sensor configured to detect that the footrest is pressed. Conditions for the travel control unit to perform the travel control include a condition that the footrest is pressed.

10 Claims, 5 Drawing Sheets

(56) References Cited

U.S. PATENT DOCUMENTS

2016/0318515 A1* 11/2016 Laur ............... B60W 30/18163
2017/0129499 A1    5/2017 Odate
2017/0192546 A1*  7/2017 Park .................... G06F 3/03547

FOREIGN PATENT DOCUMENTS

| JP | 2017-087883 A | | 5/2017 | |
|----|---------------|---|--------|---|
| KR | 20080047742 A | * | 5/2008 | |
| WO | WO-2020002002 A1 | * | 1/2020 | ............... G05G 1/30 |
| WO | WO-2020142804 A1 | * | 7/2020 | ............... G05G 1/38 |

OTHER PUBLICATIONS

English Translation: Cho, KR 20080047742 A, May 2008, Korean Patent Office Publication (Year: 2008).*
English Translation: Mewe, DE102013202427 A1, Aug. 2014, German Patent Office Publication (Year: 2014).*
English Translation: Wagemann, WO 2020002002 A1, Jan. 2020, WIPO Patent Office Publication (Year: 2020).*

* cited by examiner

VEHICLE AND CONTROL DEVICE FOR THE SAME

CROSS-REFERENCE TO RELATED APPLICATION(S)

This application claims priority to and the benefit of Japanese Patent Application No. 2019-004609 filed on Jan. 15, 2019, the entire disclosure of which is incorporated herein by reference.

BACKGROUND OF THE INVENTION

Field of the Invention

The present invention relates to a vehicle and a control device for the same.

Description of the Related Art

Various levels of automated driving are provided as intermediate steps to the automated driving that does not require human intervention (i.e. full automation). Some levels of automated driving require that the driver can immediately take over driving. In Japanese Patent Laid-Open No. 2017-87883, it is stated that conditions for continuing the lane keeping function include that the driver keeps holding the steering wheel.

SUMMARY OF THE INVENTION

Some levels of automated driving do not require that the driver keeps holding the steering wheel, and only require that the driver is sitting in the driver's seat. It is troublesome for the driver to keep holding the steering wheel even in such cases. An aspect of the present invention provides a new technology for detecting that the driver is sitting in the driver's seat.

Some embodiments of the present invention provide a control device for a vehicle that has a footrest that is located in front of and below a driver's seat, comprising: a travel control unit configured to automatically perform travel control that includes at least one of: acceleration/deceleration; and steering, of the vehicle; and a footrest sensor configured to detect that the footrest is pressed, wherein conditions for the travel control unit to perform the travel control include a condition that the footrest is pressed.

DESCRIPTION OF THE EMBODIMENTS

Figure 1:
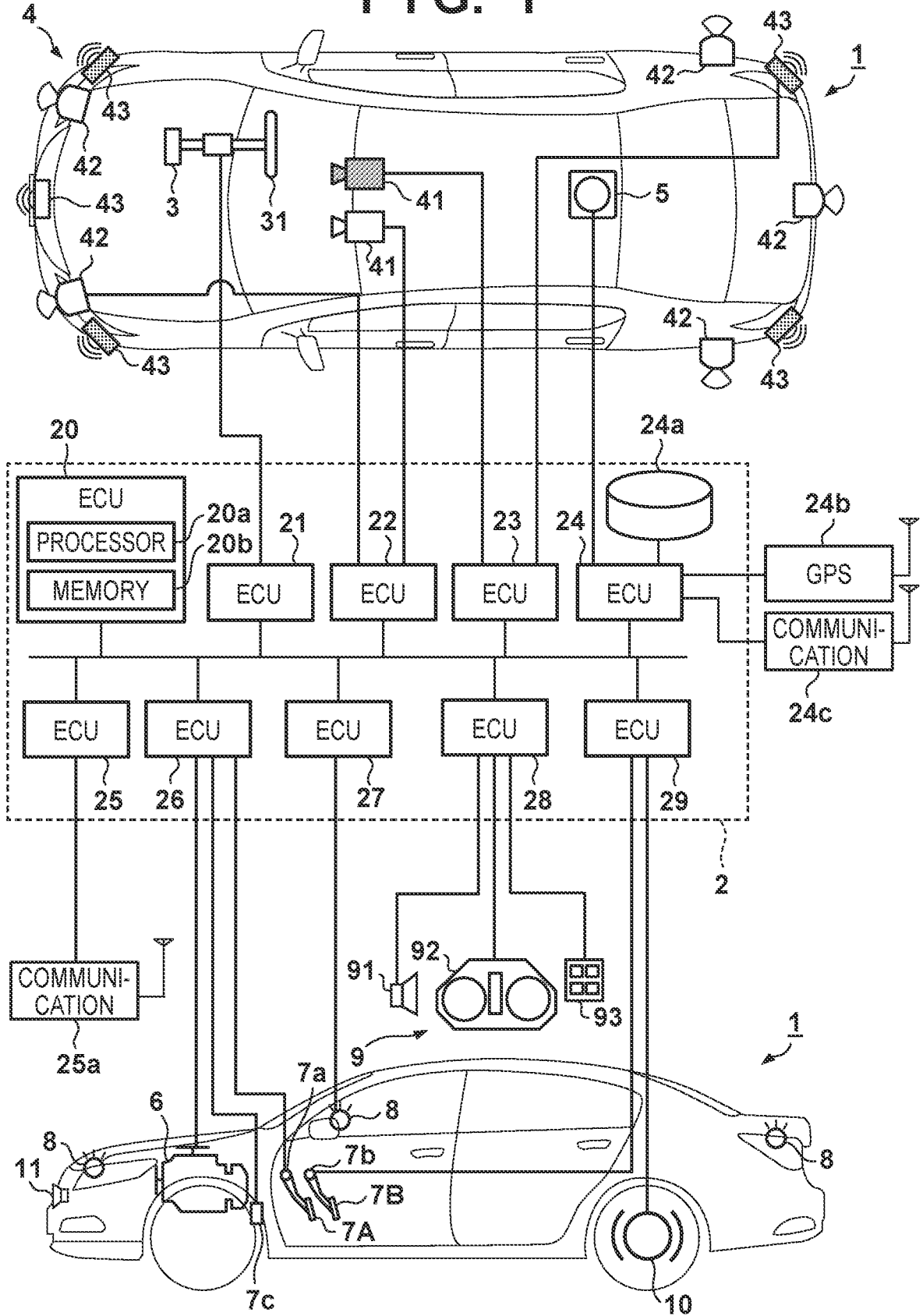
FIG. 1 is a block diagram illustrating an example of a configuration of a vehicle according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

A vehicle 1 includes a vehicle control device 2 (hereinafter simply referred to as the control device 2) that controls the vehicle 1. The control device 2 includes a plurality of ECUs 20 to 29 that are connected so as to able to communicate with each other via an in-vehicle network. Each ECU includes a processor, which is typically a CPU, a memory such as a semiconductor memory, an interface for an external device, and so on. The memory stores therein a program that is to be executed by the processor, data that is to be used by the processor to perform processing, and so on. Each ECU may include a plurality of processors, a plurality of memories, a plurality of interfaces, and so on. For example, the ECU 20 includes a processor 20a and a memory 20b. The processor 20a executes an instruction included in a program stored in the memory 20b, and thus the ECU 20 executes processing. Instead, the ECU 20 may include a dedicated integrated circuit such as an ASIC (application-specific integrated circuit) to execute processing that is to be executed by the ECU 20. The same applies to the other ECUs.

The following describes the functions of the ECUs 20 to 29, and so on. The number and the functions of the ECUs can be designed as appropriate, and may be further divided or integrated, compared with the present embodiment.

The ECU 20 performs control related to automated driving of the vehicle 1. In automated driving, at least one of: steering; and acceleration/deceleration, of the vehicle 1 is automatically controlled. In the example of control described below, both steering and acceleration/deceleration are automatically controlled.

The ECU 21 controls an electric power steering device 3. The electric power steering device 3 includes a mechanism for steering the front wheels according to a driving operation (a steering operation) performed by the driver with a steering wheel 31. The electric power steering device 3 also includes a motor that generates a driving force that is used to assist a steering operation or automatically steer the front wheels, a sensor that detects the steering angle, and so on. When the state of driving of the vehicle 1 is automated driving, the ECU 21 automatically controls the electric power steering device 3 according to an instruction from the ECU 20, and controls the direction of travel of the vehicle 1.

The ECUs 22 and 23 control detection units 41 to 43 that detect external circumstances of the vehicle, and perform information processing on the results of detection. The detection units 41 are cameras that capture images of objects in front of the vehicle 1 (hereinafter may also be denoted as the cameras 41). In the present embodiment, the cameras 41 are attached to the vehicle interior side of the front window in a front portion of the roof of the vehicle 1. By analyzing the images captured by the cameras 41, it is possible to extract the outline of a target and a lane marker (e.g. a white line) on the road.

The detection units 42 are lidar (Light Detection and Ranging) devices (hereinafter may also be denoted as the lidar devices 42), and detect a target around the vehicle 1 and measure the distance to a target. In the present embodiment, five lidar devices 42 are provided, specifically one at each corner of a front portion of the vehicle 1, one at the center or a rear portion of the vehicle 1, and one at each side of the rear portion. The detection units 43 are millimeter-wave radar devices (hereinafter may also be denoted as the radar devices 43), and detect a target around the vehicle 1 and measure the distance to a target. In the present embodiment, five radar devices 43 are provided, specifically one at the center of the front portion of the vehicle 1, one at each corner of the front portion, and one at each corner of the rear portion of the vehicle 1.

The ECU 22 controls one of the cameras 41 and each lidar device 42, and performs information processing on the results of detection. The ECU 23 controls the other of the cameras 41 and each radar device 43, and performs information processing on the results of detection. Due to two pairs of devices that detect the circumstances of the vehicle, it is possible to improve the reliability of the results of detection. Also, due to different types of detection units such as cameras, lidar devices, and radar devices, it is possible to analyze the environment around the vehicle in various aspects.

The ECU 24 controls a gyro sensor 5, a GPS sensor 24b, and a communication device 24c, and performs information processing on the results of detection or communication. The gyro sensor 5 detects rotational motion of the vehicle 1. The direction of travel of the vehicle 1 can be discerned based on the results of detection performed by the gyro sensor 5, the wheel speed, and so on. The GPS sensor 24b detects the current position of the vehicle 1. The communication device 24c performs wireless communication with a server that provides map information and traffic information, and acquires such pieces of information. The ECU 24 can access a map information database 24a that is built up in a memory, and the ECU 24 searches for a route from the current location to the destination, for example. The ECU 24, the map database 24a, and the GPS sensor 24b constitute a so-called navigation device.

The ECU 25 includes a communication device 25a for inter-vehicle communication. The communication device 25a performs wireless communication with another vehicle around the vehicle 1, and exchanges information between the vehicles.

The ECU 26 controls a power plant 6. The power plant 6 is a mechanism that outputs a drive force to rotate the driving wheels of the vehicle 1, and includes an engine and a transmission, for example. The ECU 26 controls the output of the engine in response to a drive operation (an accelerator pedal operation or an acceleration operation) performed by the driver and detected by an operation detection sensor 7a that is provided in an accelerator pedal 7A, or shifts the gears of the transmission based on information such as the vehicle speed detected by a vehicle speed sensor 7c, for example. When the state of driving of the vehicle 1 is automated driving, the ECU 26 automatically controls the power plant 6 according to an instruction from the ECU 20 to control acceleration and deceleration of the vehicle 1.

The ECU 27 controls lighting devices 8 (lights such as headlights and taillights) including direction indicators (blinkers). In the example shown in FIG. 1, the lighting devices 8 are provided on the front portion, the door mirrors, and the rear portion of the vehicle 1. The ECU 27 also controls an acoustic device 11 directed toward the outside of the vehicle, including a vehicle horn. The lighting devices 8, the acoustic device 11, and the combination thereof have the function of providing information to the outside of the vehicle 1.

The ECU 28 controls an input/output device 9. The input/output device 9 outputs information to the driver, and receives information input from the driver. A sound output device 91 outputs sound to provide the driver with information. A display device 92 displays images to provide the driver with information. The display device 92 is provided on the surface of the driver's seat, for example, and constitutes an instrument panel or the like. Although sound and display are given as examples, vibration or light may be used to provide information. Also, two or more elements from among sound, display, vibration, and light may be combined to provide information. Furthermore, the combination or the mode of providing information may be varied according to the level (e.g. the emergency level) of information that is to be provided. Input devices 93 are a set of switches that are located such that the driver can operate them and are used to input instructions to the vehicle 1. The input devices 93 may also include a sound input device. The ECU 28 can provide guidance regarding travel control performed by the ECU 20. The details of the guidance will be described later. The input device 93 may include a switch that is used to control travel control actions performed by the ECU 20. The input devices 93 may include a camera for detecting the line of sight of the driver.

The ECU 29 controls brake devices 10 and a parking brake (not shown). The brake devices 10 are disc brake devices, for example, and are respectively provided on the wheels of the vehicle 1 and decelerate or stop the vehicle 1 by applying resistance to the rotation of the wheels. The ECU 29 controls the action of the brake devices 10 in response to a driving operation (a braking operation) performed by the driver and detected by an operation detection sensor 7b that is provided in a brake pedal 7B, for example. When the state of driving of the vehicle 1 is automated driving, the ECU 29 automatically controls the brake devices 10 according to an instruction from the ECU 20, and controls deceleration and stopping of the vehicle 1. The brake devices 10 and the parking brake may operate to keep the vehicle 1 in a stopped state. Also, if the transmission of the power plant 6 includes a parking lock mechanism, the parking lock mechanism may be operated in order to keep the vehicle 1 in a stopped state.

Figure 2:
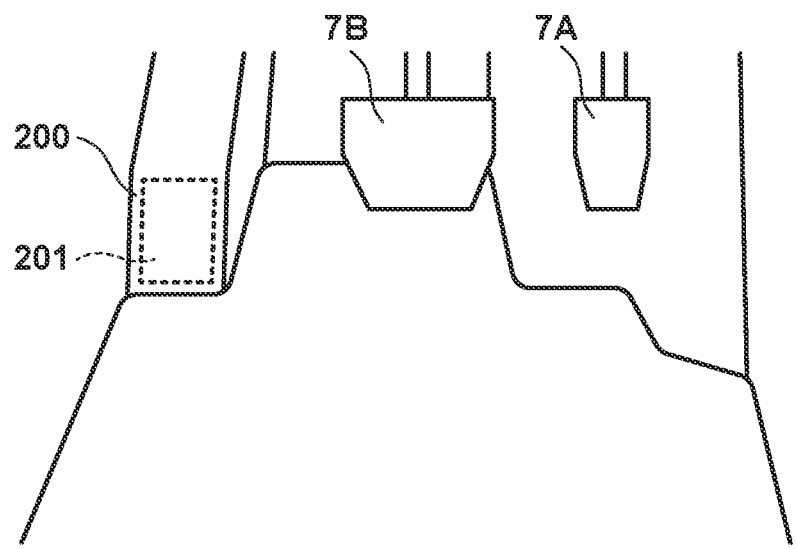
FIG. 2 is a schematic diagram illustrating an example of a configuration of an area that is in front of and below a driver's seat according to the embodiment.

The following describes an example of a configuration of an area that is in front of and below the driver's seat of the vehicle 1 with reference to FIG. 2. In the area that is in front of and below the driver's seat of the vehicle 1, the brake pedal 7B is provided substantially at the center, the accelerator pedal 7A is provided on the right side, and a footrest 200 is provided on the left side. The footrest 200 is a structure on which the driver of the vehicle 1 can place their foot (specifically, the left foot) while seated. The footrest 200 is provided with a footrest sensor 201 that can detect that the footrest 200 is pressed by the foot of the driver of the vehicle 1. The footrest sensor 201 may be constituted by a pressure sensor that can detect a plurality of levels of pressure, or a switch that can have one of two states (ON or OFF).

Figure 3:
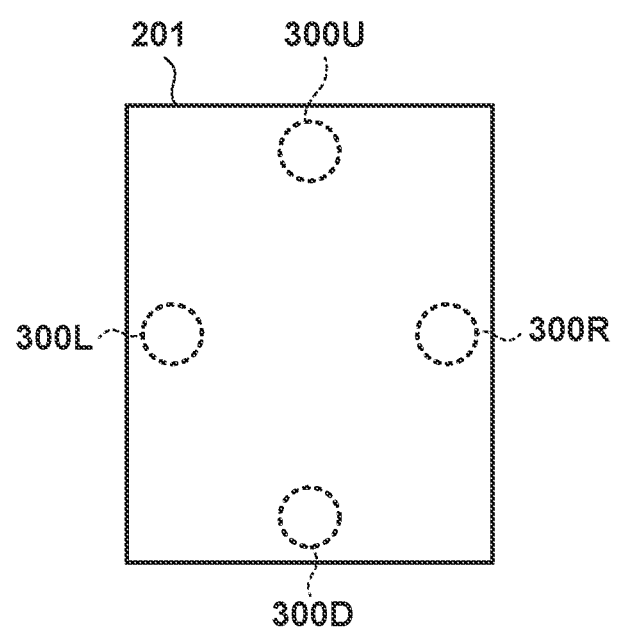
FIG. 3 is a schematic diagram illustrating an example of a configuration of a footrest sensor according to the embodiment.

The following describes an example of a configuration of the footrest sensor 201 with reference to FIG. 3. The footrest sensor 201 includes a pressure sensor 300U that is provided in an upper portion, a pressure sensor 300D that is provided in a lower portion, a pressure sensor 300R that is provided in a right portion, and a pressure sensor 300L that is provided in a left portion. The footrest sensor 201 detects that the footrest is pressed, based on detection values of the pressure sensors 300U, 300D, 300R, and 300L. For example, the footrest sensor 201 detects that the driver has placed their foot on the footrest 200 when a representative value (e.g. the average value, the total value, the maximum value, or the minimum value) of the detection values of the four pressure sensors 300U, 300D, 300R, and 300L is no less that a predetermined threshold value.

The footrest sensor 201 may also be able to discern between pressure that is applied simply due to the driver placing their foot on the footrest 200, and pressure that is applied due to the driver intentionally pressing the footrest 200, based on the detection values of the pressure sensors 300U, 300D, 300R, and 300L.

Furthermore, the footrest sensor 201 may be able to detect the pressed position of the footrest 200, based on the detection value of each of the pressure sensors 300U, 300D, 300R, and 300L. For example, when the detection value of the pressure sensor 300U provided in the upper portion exceeds a predetermined threshold value, the footrest sensor 201 detects that the driver has intentionally performed an operation to press the upper portion of the footrest 200. The same applies to operations performed to press the lower portion, the left portion, and the right portion of the footrest 200.

Figure 4:
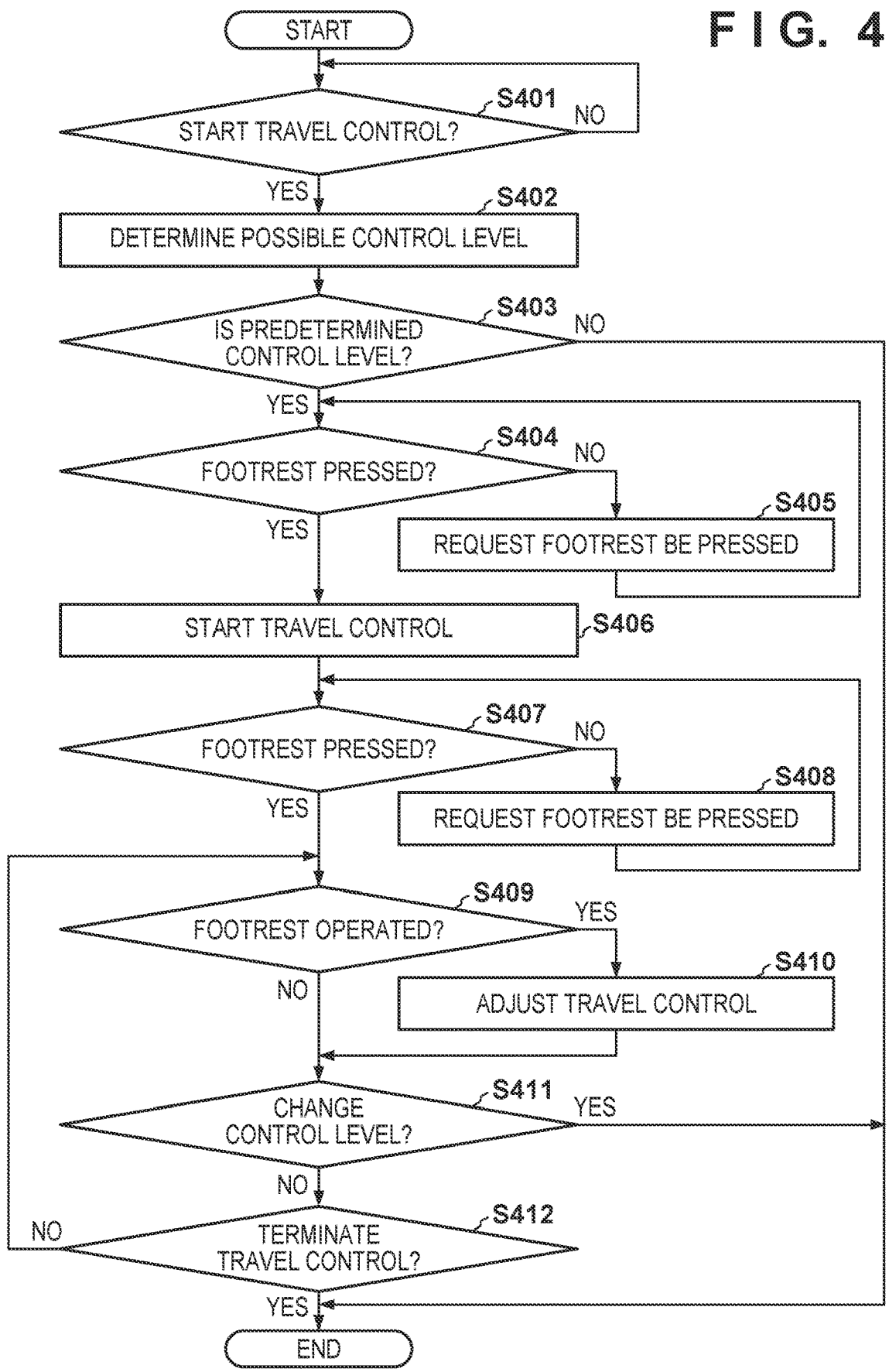
FIG. 4 is a flowchart illustrating an example of a method for controlling a vehicle according to the embodiment.

The following describes a method for controlling travel of the vehicle 1 with reference to FIG. 4. According to this control method, the vehicle 1 (specifically, the ECU 20) performs travel control that includes at least one of: acceleration/deceleration; and steering, of the vehicle 1. It is assumed that the vehicle 1 is manually driven when the control method shown in FIG. 4 is started.

The control method shown in FIG. 4 may be performed by the processor 20a of the ECU 20 executing a program stored in the memory 20b. Instead, one or more or all of the steps included in the method may be performed by a dedicated circuit such as an ASIC. In the former case, the processor 20a serves as a constituent element for a specific action. In the latter case, the dedicated circuit serves as a constituent element for a specific action.

In step S401, the ECU 20 determines whether or not to start travel control. If travel control is to be started (YES in step S401), the ECU 20 moves processing to step S402, and otherwise (NO in step S401) the ECU 20 moves processing to step S401. That is to say, in step S401, the ECU 20 waits until travel control should be started. Travel control is control through which the ECU 20 automatically performs at least one of: acceleration/deceleration; and steering, of the vehicle 1. The ECU 20 may determine that travel control should be started upon the ECU 20 being instructed by the driver to start travel control. Also, the ECU 20 may determine that travel control should be started upon determining that travel control can be performed, based on the environment around the vehicle 1.

In step S402, the ECU 20 determines the level of travel control that can be performed, based on the environment around the vehicle 1. The level of travel control is determined based on, for example, the type of the road (a general road or a highway), the speed of the vehicle 1 (a low speed or a high speed), the status of vehicles around the vehicle 1, and so on.

In step S403, the ECU 20 determines whether or not the level determined in step S402 is a predetermined level. If the level determined in step S402 is the predetermined level (YES in step S403), the ECU 20 moves processing to step S404, and otherwise (NO in step S403) the ECU 20 terminates processing. In the present embodiment, the predetermined level is a level at which conditions for performing travel control include the condition that the footrest 200 is pressed by the driver's foot. If the determined level is not the predetermined level (e.g. a level at which the driver needs to hold the steering wheel), the ECU 20 performs processing corresponding to the determined level. The predetermined level may be a level at which conditions for performing travel control include a condition other than the condition that the footrest 200 is pressed.

In step S404, the ECU 20 determines whether or not the footrest 200 is pressed. If the footrest 200 is pressed (YES in step S404), the ECU 20 moves processing to step S406, and otherwise (NO in step S404) the ECU 20 moves processing to step S405. For example, the ECU 20 may determine whether or not the detection value of the footrest sensor 201 is greater than a predetermined value that is assumed to be taken when the driver places their foot on the footrest 200.

In step S405, the ECU 20 requests that the driver place their foot on the footrest 200, and moves processing to step S404. That is to say, in steps S404 and S405, the ECU 20 waits until the driver places their foot on the footrest 200. If a predetermined period (e.g. ten seconds) has elapsed without the driver placing their foot on the footrest 200, the ECU 20 may stop performing the control method shown in FIG. 4.

In step S406, the ECU 20 starts travel control. That is to say, the ECU 20 starts travel control on the condition that the footrest 200 is pressed.

In step S407, the ECU 20 determines whether or not the footrest 200 is pressed. If the footrest 200 is pressed (YES in step S407), the ECU 20 moves processing to step S409, and otherwise (NO in step S407) the ECU 20 moves processing to step S408. For example, the ECU 20 may determine whether or not the detection value of the footrest sensor 201 is greater than a predetermined value that is assumed to be taken when the driver places their foot on the footrest 200.

In step S408, the ECU 20 requests that the driver place their foot on the footrest 200, and moves processing to step S407. That is to say, if the driver has removed their foot from the footrest 200 during travel control, the ECU 20 waits until the driver places their foot on the footrest 200, in steps S407 and S408. If a predetermined period (e.g. ten seconds) has elapsed without the driver placing their foot on the footrest 200, the ECU 20 may stop performing travel control and stop performing the control method shown in FIG. 4.

In step S409, the ECU 20 determines whether or not the footrest 200 has been operated using pressure. If the footrest 200 has been operated using pressure (YES in step S409), the ECU 20 moves processing to step S410, and otherwise (NO in step S409) the ECU 20 moves processing to step S411.

In step S410, the ECU 20 adjusts travel control based on the pressed position of the footrest 200. The details of this action will be described later.

In step S411, the ECU 20 determines whether or not the control level should be changed to a level other than the predetermined level in step S403. If the control level should be changed (YES in step S411), the ECU 20 terminates processing, and otherwise (NO in step S411) the ECU 20 moves processing to step S412. For example, the ECU 20 performs this determination based on a change in the environment around the vehicle 1. If the conditions for performing travel control at the level thus changed do not include the condition that the footrest 200 is pressed by the driver's foot, the ECU 20 performs control corresponding to the level thus changed, without performing control shown in FIG. 4 corresponding to the condition that the footrest 200 is pressed.

In step S412, the ECU 20 determines whether or not to terminate travel control. If travel control should be terminated (YES in step S412), the ECU 20 terminates processing, and otherwise (NO in step S412) the ECU 20 moves processing to step S409. The ECU 20 may determine that travel control should be terminated upon the ECU 20 being instructed by the driver to terminate travel control. Also, the ECU 20 may determine that travel control should be terminated upon determining that travel control cannot be performed, based on the environment around the vehicle 1.

Figure 5:
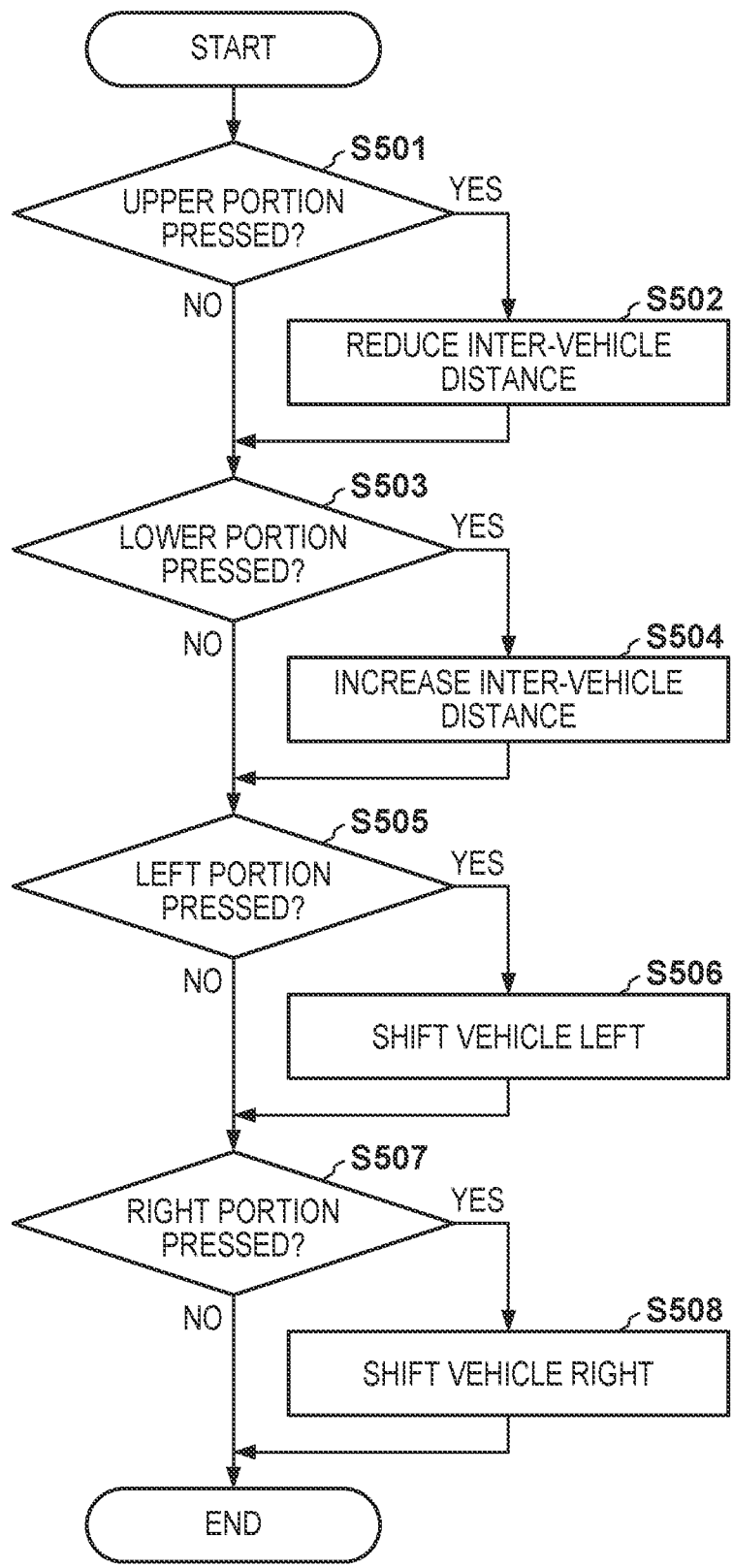
FIG. 5 is a flowchart illustrating an example of a method for changing travel parameters according to the embodiment.

The following describes the details of step S410 with reference to FIG. 5. In step S501, the ECU 20 determines whether or not the upper portion of the footrest 200 has been pressed. If the upper portion of the footrest 200 has been pressed (YES in step S501), the ECU 20 moves processing to step S502, and otherwise (NO in step S501) the ECU 20 moves processing to step S503. In step S502, the ECU 20 adjusts parameters for travel control so as to reduce the inter-vehicle distance to a vehicle that travels ahead of the vehicle 1 (hereinafter referred to as the vehicle ahead).

In step S503, the ECU 20 determines whether or not the lower portion of the footrest 200 has been pressed. If the lower portion of the footrest 200 has been pressed (YES in step S503), the ECU 20 moves processing to step S504, and otherwise (NO in step S503) the ECU 20 moves processing to step S505. In step S504, the ECU 20 adjusts parameters for travel control so as to increase the inter-vehicle distance to the vehicle ahead of the vehicle 1.

In step S505, the ECU 20 determines whether or not the left portion of the footrest 200 has been pressed. If the left portion of the footrest 200 has been pressed (YES in step S505), the ECU 20 moves processing to step S506, and otherwise (NO in step S505) the ECU 20 moves processing to step S507. In step S506, the ECU 20 adjusts parameters for travel control so as to shift the position of the vehicle 1 in the width direction, relative to the lane in which the vehicle 1 is travelling (hereinafter referred to as the travel lane), to the left.

In step S507, the ECU 20 determines whether or not the right portion of the footrest 200 has been pressed. If the right portion of the footrest 200 has been pressed (YES in step S507), the ECU 20 moves processing to step S508, and otherwise (NO in step S507) the ECU 20 terminates processing.

In step S508, the ECU 20 adjusts parameters for travel control so as to shift the position of the vehicle 1 in the width direction, relative to the travel lane, to the right.

Figure 6:
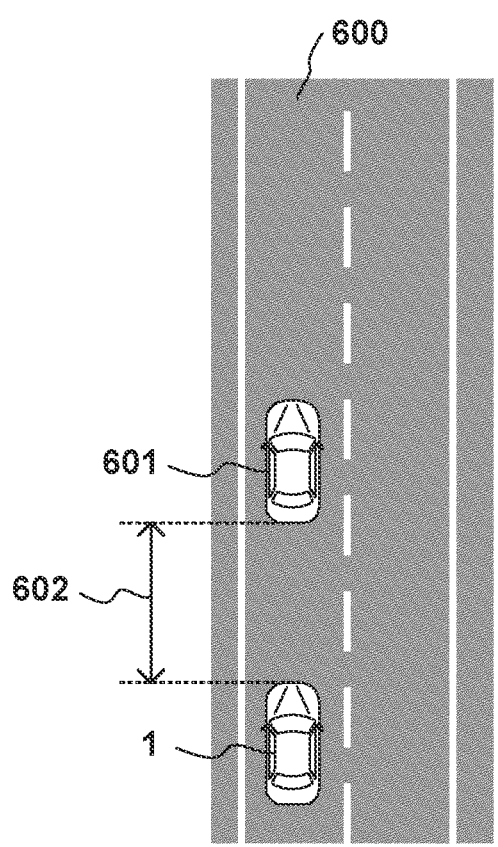
FIG. 6 is a schematic diagram illustrating an example in which an inter-vehicle distance is changed according to the embodiment.

The following describes specific examples of steps S502 and S504 with reference to FIG. 6. The vehicle 1 is travelling in a lane 600. That is to say, the lane 600 is the travel lane. A vehicle 601 that is ahead of the vehicle 1 is travelling in the travel lane. The vehicle 601 is the vehicle ahead of the vehicle 1. The distance between the vehicle 1 and the vehicle 601 is an inter-vehicle distance 602.

When the ECU 20 performs travel control to automatically track the vehicle 601, the ECU 20 controls the vehicle 1 such that the inter-vehicle distance 602 is a default value of the parameter regarding the inter-vehicle distance, which has been set to the ECU 20 (e.g. 100 m at 100 km/h. This value varies according to the speed).

When the inter-vehicle distance is to be reduced in step S502, the ECU 20 reduces the value of the parameter regarding the inter-vehicle distance by a predetermined amount (e.g. 10 m). On the other hand, when the inter-vehicle distance is to be increased in step S504, the ECU 20 increases the value of the parameter regarding the inter-vehicle distance by a predetermined amount (e.g. 10 m). Such predetermined amounts may be determined based on the speed of the vehicle 1 and traffic conditions around the vehicle 1. As described above, the ECU 20 adjusts the inter-vehicle distance 602 to the vehicle 601 based on the pressed position in the upper portion or the lower portion of the footrest 200.

Figure 7:
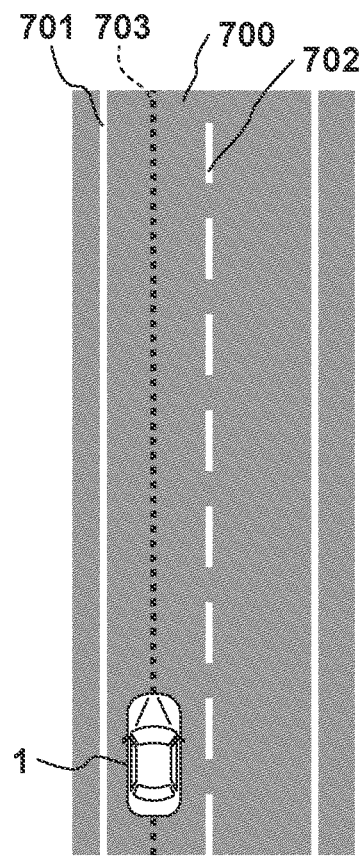
FIG. 7 is a schematic diagram illustrating an example in which a travel position is changed according to the embodiment.

The following describes specific examples of steps S506 and S508 with reference to FIG. 7. The vehicle 1 is travelling in a lane 700. That is to say, the lane 700 is the travel lane. The lane 700 is defined by a left marker 701 (e.g. a line on the left of a roadway) and a right marker 702 (e.g. a lane boundary line).

When the ECU 20 performs travel control to keep the vehicle 601 in the lane, the ECU 20 controls the vehicle 1 such that the center of the vehicle 1 in the width direction, relative to the lane 700, is located on a lane center line 703. The lane center line 703 is a center line between the marker 701 and the marker 702.

When the vehicle is to be shifted to the left in step S506, the ECU 20 shifts the position of the vehicle 1 in the width direction, relative to the lane 700, to the left by a predetermined amount (e.g. 30 cm). When the vehicle is to be shifted to the right in step S508, the ECU 20 shifts the position of the vehicle 1 in the width direction, relative to the lane 700, to the right by a predetermined amount (e.g. 30 cm). Such predetermined amounts may be determined based on the width of the lane 700 and the positional relationship with vehicles around the vehicle 1. As described above, the ECU 20 adjusts the position of the vehicle 1 in the width direction, relative to the lane 700, based on the pressed position in the left portion or the right portion of the footrest 200.

According to the above-described control method, the ECU 20 performs both automatic tracking of the vehicle ahead and automatic lane keeping. Instead, the ECU 20 may perform only one of the functions. Also, according to the above-described control method, the ECU 20 performs both the adjustment of the inter-vehicle distance to the vehicle ahead, and the adjustment of the position of the vehicle in the width direction, relative to the travel lane. Instead, the ECU 20 may perform only one of the adjustments, or perform neither of them. Even when the ECU 20 performs neither of the adjustments, the footrest sensor 201 is used to detect that the driver's foot is placed on the footrest 200.

Summary of Embodiment

Configuration 1

A control device for a vehicle (1) that has a footrest (200) that is located in front of and below a driver's seat, comprising:

a travel control unit (20) configured to automatically perform travel control that includes at least one of: acceleration/deceleration; and steering, of the vehicle; and a footrest sensor (201) configured to detect that the footrest is pressed, wherein conditions for the travel control unit to perform the travel control include a condition that the footrest is pressed (S404, S407).

With this configuration, it is possible to determine that the driver is sitting in the driver's seat, with less burden on the driver, compared to the case in which the driver needs to hold the steering wheel.

Configuration 2

The control device according to Configuration 1, wherein the footrest sensor is configured to detect a pressed position of the footrest, and the travel control unit adjusts the travel control based on the pressed position of the footrest (S410).

With this configuration, it is possible to adjust the travel control state of the vehicle, using the footrest.

Configuration 3

The control device according to Configuration 2, wherein the travel control unit adjusts an inter-vehicle distance (602) to a vehicle (601) that is ahead of the vehicle, based on the pressed position of the footrest (S502, S504).

With this configuration, it is possible to adjust the inter-vehicle distance, using the footrest.

Configuration 4

The control device according to Configuration 2 or 3, wherein the travel control unit adjusts a position of the vehicle in a width direction relative to a travel lane (700), based on the pressed position of the footrest (S506, S508).

With this configuration, it is possible to adjust the vehicle position, using the footrest.

Configuration 5

A vehicle (1) that is provided with the control device according to one of Configurations 1 to 4.

With this configuration, it is possible to provide a vehicle that achieves the same effect as Configuration 1.

The invention is not limited to the foregoing embodiments, and various variations/changes are possible within the spirit of the invention.

What is claimed is:

1. A control device for a vehicle that has a footrest that is located in front of and below a driver's seat, the device comprising:
    at least one processor circuit with a memory comprising instructions, that when executed by the processor circuit, cause the at least one processor circuit to at least perform automatic travel control that includes at least one of acceleration, deceleration, and steering of the vehicle; and
    a footrest sensor arranged on the footrest that is at an angle to a floor of the vehicle and configured to detect that the footrest is pressed,
    wherein conditions to perform the automatic travel control include a condition that the footrest is pressed,
    the footrest sensor has first and second sensing points arranged in a vertical direction and third and fourth sensing points arranged in a lateral direction,
    an inter-vehicle distance to a preceding vehicle that is ahead of the vehicle is adjusted based on whether the first and second sensing points are pressed, and
    a position of the vehicle in a width direction relative to a travel lane is adjusted based on whether the third and fourth sensing points are pressed.

2. The control device according to claim 1, wherein the first sensing point is arranged on an upper side of the second sensing point,
    the inter-vehicle distance to the preceding vehicle is reduced in response to the first sensing point being pressed, and
    the inter-vehicle distance to the preceding vehicle is increased in response to the second sensing point being pressed.

3. The control device according to claim 1, wherein the third sensing point is arranged on a left side of the fourth sensing point in a driver view,
    the position of the vehicle in the width direction relative to the travel lane is shifted to the left in response to the third sensing point being pressed, and
    the position of the vehicle in the width direction relative to the travel lane is shifted to the right in response to the fourth sensing point being pressed.

4. The control device according to claim 1, wherein the first sensing point is arranged on an upper side of the second sensing point,
    the third sensing point is arranged on a left side of the fourth sensing point in a driver view,
    the inter-vehicle distance to the preceding vehicle is reduced in response to the first sensing point being pressed,
    the inter-vehicle distance to the preceding vehicle is increased in response to the second sensing point being pressed,
    the position of the vehicle in the width direction relative to the travel lane is shifted to the left in response to the third sensing point being pressed, and
    the position of the vehicle in the width direction relative to the travel lane is shifted to the right in response to the fourth sensing point being pressed.

5. The control device according to claim 1, wherein the footrest is located in a lateral direction of an accelerator pedal or a brake pedal.

6. A vehicle, comprising:
    a footrest that is located in front of and below a driver's seat;
    at least one processor circuit with a memory comprising instructions, that when executed by the processor circuit, cause the at least one processor circuit to at least perform automatic travel control that includes at least one of acceleration, deceleration, and steering of the vehicle; and
    a footrest sensor arranged on the footrest that is at an angle to a floor of the vehicle and configured to detect that the footrest is pressed,
    wherein conditions to perform the automatic travel control include a condition that the footrest is pressed,
    the footrest sensor has first and second sensing points arranged in a vertical direction and third and fourth sensing points arranged in a lateral direction,
    an inter-vehicle distance to a preceding vehicle that is ahead of the vehicle is adjusted based on whether the first and second sensing points are pressed, and
    a position of the vehicle in a width direction relative to a travel lane is adjusted based on whether the third and fourth sensing points are pressed.

7. The vehicle according to claim 6, wherein the first sensing point is arranged on an upper side of the second sensing point,
    the inter-vehicle distance to the preceding vehicle is reduced in response to the first sensing point being pressed, and
    the inter-vehicle distance to the preceding vehicle is increased in response to the second sensing point being pressed.

8. The vehicle according to claim 6, wherein the third sensing point is arranged on a left side of the fourth sensing point in a driver view,
    the position of the vehicle in the width direction relative to the travel lane is shifted to the left in response to the third sensing point being pressed, and the position of the vehicle in the width direction relative to the travel lane is shifted to the right in response to the fourth sensing point being pressed.

9. The vehicle according to claim 6, wherein
the first sensing point is arranged on an upper side of the second sensing point,
the third sensing point is arranged on a left side of the fourth sensing point in a driver view,
the inter-vehicle distance to the preceding vehicle is reduced in response to the first sensing point being pressed,
the inter-vehicle distance to the preceding vehicle is increased in response to the second sensing point being pressed,
the position of the vehicle in the width direction relative to the travel lane is shifted to left in response to the third sensing point being pressed, and
the position of the vehicle in the width direction relative to the travel lane is shifted to right in response to the fourth sensing point being pressed.

10. The vehicle according to claim 6, wherein the footrest is located in a lateral direction of an accelerator pedal or a brake pedal.

* * * * *